(12) United States Patent
Pathak et al.

(10) Patent No.: US 10,679,066 B2
(45) Date of Patent: Jun. 9, 2020

(54) BEST IMAGE GRAB FROM VIDEO WITH DIGITAL GRID ASSISTANCE FOR AVIATION ENGINE BORESCOPE INSPECTION

(71) Applicant: General Electric Company, Schenectady, NY (US)

(72) Inventors: Karunamay Pathak, Bangalore (IN); Mohsin Khan, Bangalore (IN); Aditya Bhakta, Bangalore (IN); Rebinth Robin, Bangalore (IN)

(73) Assignee: General Electric Company, Schenectady, NY (US)

( * ) Notice: Subject to any disclaimer, the term of this patent is extended or adjusted under 35 U.S.C. 154(b) by 135 days.

(21) Appl. No.: 15/933,095

(22) Filed: Mar. 22, 2018

(65) Prior Publication Data

US 2019/0294883 A1    Sep. 26, 2019

(51) Int. Cl.
| | | |
|---|---|---|
| *G06K 9/00* | (2006.01) | |
| *G06N 3/08* | (2006.01) | |
| *B64F 5/60* | (2017.01) | |
| *G06K 9/62* | (2006.01) | |
| *G06K 9/42* | (2006.01) | |

(Continued)

(52) U.S. Cl.
CPC ............ *G06K 9/00744* (2013.01); *B64F 5/60* (2017.01); *F01D 5/005* (2013.01); *G06K 9/00671* (2013.01); *G06K 9/00718* (2013.01); *G06K 9/42* (2013.01); *G06K 9/627* (2013.01); *G06K 9/6255* (2013.01); *G06K 9/6261* (2013.01); *G06N 3/08* (2013.01); *G06T 7/0004* (2013.01); *G06T 2207/10016* (2013.01); *G06T 2207/20081* (2013.01); *G06T 2207/30164* (2013.01)

(58) Field of Classification Search
None
See application file for complete search history.

(56) References Cited

U.S. PATENT DOCUMENTS

| | | |
|---|---|---|
| 8,761,490 B2 | 6/2014 | Scheid et al. |
| 8,781,209 B2 | 7/2014 | Scheid et al. |
| 8,781,210 B2 | 7/2014 | Scheid et al. |

(Continued)

FOREIGN PATENT DOCUMENTS

| | | |
|---|---|---|
| WO | 93/00766 | 1/1993 |
| WO | 2013/066916 A1 | 5/2013 |
| WO | 2013/067384 A1 | 5/2013 |

OTHER PUBLICATIONS

International Search Report and Written Opinion received for PCT Application Serial No. PCT/US2019/023241 dated Jun. 19, 2019, 18 pages.

*Primary Examiner* — Randolph I Chu
(74) *Attorney, Agent, or Firm* — Amin, Turocy & Watson, LLP

(57) ABSTRACT

Systems, computer-implemented methods and/or computer program products that facilitate aviation engine inspection are provided. In one embodiment, a computer-implemented method comprises: generating, by a system operatively coupled to a processor, a digital grid and visual layer overlay on a raw video feed from borescope inspections; analyzing, by the system, the video feed and identifying frames that capture information of part damage and defects; and classifying, by the system, type of part defect, determining location of defect and learning the digital grid.

20 Claims, 11 Drawing Sheets

(51) Int. Cl.
*G06T 7/00* (2017.01)
*F01D 5/00* (2006.01)

(56) References Cited

U.S. PATENT DOCUMENTS

| | | | |
|---|---|---|---|
| 9,471,057 | B2 | 10/2016 | Scheid et al. |
| 9,476,823 | B2 | 10/2016 | Ward et al. |
| 9,620,107 | B2 | 4/2017 | Lambdin et al. |
| 2003/0229420 | A1* | 12/2003 | Buckingham ........ A61B 1/0055 700/245 |
| 2009/0193113 | A1* | 7/2009 | Lunde .................. G06F 9/5072 709/224 |
| 2012/0109353 | A1* | 5/2012 | Boero .................. G06Q 10/06 700/104 |
| 2014/0207874 | A1 | 7/2014 | Soorianarayanan et al. |
| 2015/0319410 | A1 | 11/2015 | Gu et al. |
| 2016/0327493 | A1* | 11/2016 | Sullivan ............. G01N 21/8806 |
| 2018/0342069 | A1* | 11/2018 | Lim ...................... G06T 7/0008 |
| 2019/0095765 | A1* | 3/2019 | Lim ...................... G06K 9/6262 |
| 2019/0147127 | A1* | 5/2019 | Su .......................... G03F 7/705 |
| 2019/0228514 | A1* | 7/2019 | Hestand ............. G01N 21/8851 |

\* cited by examiner

BEST IMAGE GRAB FROM VIDEO WITH DIGITAL GRID ASSISTANCE FOR AVIATION ENGINE BORESCOPE INSPECTION

BACKGROUND

The subject disclosure relates to facilitating aviation engine inspection, and more specifically, facilitating aviation engine borescope inspection by employing digital grid assistance.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments herein, devices, systems, computer-implemented methods, apparatus and/or computer program products that facilitate aviation engine inspection.

According to one embodiment, a system is provided. The system can comprise a memory that stores computer executable components. The system can also comprise a processor, operably coupled to the memory, and that can execute computer executable components stored in the memory. The computer executable components can comprise a grid component that generates a digital grid and visual layer overlay on a raw video feed from borescope inspections. The computer executable components can further comprise a selection component that analyzes the video feed and identifies frames that capture information of part damage and defects. The computer executable components can further comprise a machine learning component that classifies type of part defect, determines location of defect and learns the digital grid.

According to another embodiment, a computer-implemented method is provided. The computer-implemented method can comprise generating, by a system operatively coupled to a processor, a digital grid and visual layer overlay on a raw video feed from borescope inspections. The computer-implemented method can further comprise analyzing, by the system, the video feed and identifying frames that capture information of part damage and defects. The computer-implemented method can further comprise classifying, by the system, type of part defect, determining location of defect and learning the digital grid.

According to another embodiment, a computer program product facilitating aviation engine inspection. The computer program product can comprise a computer readable storage medium having program instructions embodied therewith. The program instructions can be executable by a processor to cause the processor to generate a digital grid and visual layer overlay on a raw video feed from borescope inspections. The program instructions can further be executable by a processor to cause the processor to analyze the video feed and identify frames that capture information of part damage and defects. The program instructions can further be executable by a processor to cause the processor to classify type of part defect, determine location of defect and learn the digital grid.

DETAILED DESCRIPTION

Figure 1:
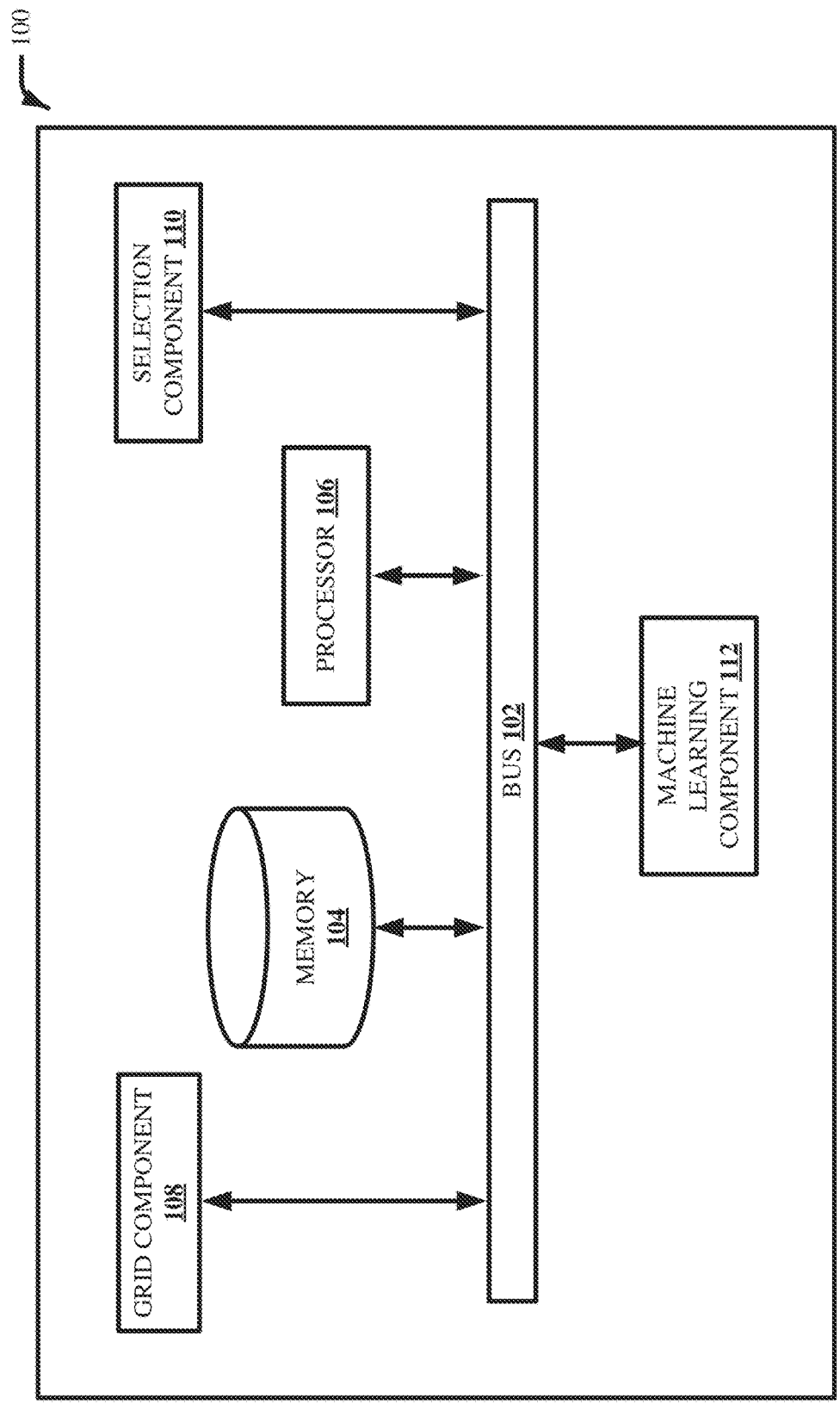
FIG. 1 illustrates a block diagram of an example, non-limiting system facilitating aviation engine inspection in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A full engine borescope inspection can typically be an eight-hour video feed. Only specific portions of the video contain relevant information pertaining to part defect or part damage. The inspector or technician needs to be always attentive to what is visible on the screen while navigating through different engine components. This can sometime require longer time due to breaks required to address inspector fatigue, or if pressed for time can lead to missing defects during video capture. Defective regions may be captured but not tagged or selected for detailed video inspection. Storage and retrieval of such large video feeds can also be a time intensive activity.

One or more embodiments described herein can address this challenge by employing machine learning to speed up the process of aviation engine inspection, reduce misses of defect due to oversight and decrease borescope time, which can result in more time on wing. One or more embodiments described herein can enable smart inspection of aviation engine components during borescope inspections. One or more embodiments described herein can create a digital grid and visual layer overlay on a raw video feed from the borescope inspection. The digital grid can enable standardized images to be taken by removing variation in image capture for enhanced auto analysis. The resulting uniform borescope images can enable faster image processing. One or more embodiments described herein can perform data processing and frame selection. One or more embodiments described herein can auto analyze the raw video feed and identify the frames that capture information of significance such as part defect, defect dimensions, etc. Selecting the frames that capture information of significance can help with storage and retrieval of historic borescope inspection.

One or more embodiments described herein can employ machine learning to classify the type of part defect and determine the location of defect. The results can be displayed as additional information in an augmented reality layer on the raw video feed for inspector assistance. It is appreciated that the augmented reality layer can be displayed in the same screen as the borescope inspection video or in a different screen. The embodiments described herein can be implemented in two modes: online and offline. In the online mode, the augmented reality layer of the video (e.g., digital grid, defect classification, defect location, etc.) can overlap the raw video feed. In the offline mode, machine learning can analyze the stored borescope inspection video and continuously improve the digital grid, frame selection, defect identification, etc.

FIG. 1 illustrates a block diagram of an example, non-limiting system facilitating aviation engine inspection in accordance with one or more embodiments described herein. Aspects of systems (e.g., system 100 and the like), apparatuses or processes explained in this disclosure can constitute one or more machine-executable components embodied within one or more machines, e.g., embodied in one or more computer readable mediums (or media) associated with one or more machines. Such components, when executed by the one or more machines, e.g., computers, computing devices, virtual machines, etc., can cause the machines to perform the operations described.

In various embodiments, the system 100 can be any type of component, machine, device, facility, apparatus, and/or instrument that comprises a processor. In some embodiments, system 100 is capable of effective and/or operative communication with a wired and/or wireless network. Components, machines, apparatuses, devices, facilities, and/or instrumentalities that can comprise the system 100 can include, but are not limited to, tablet computing devices, handheld devices, server class computing machines and/or databases, laptop computers, notebook computers, desktop computers, cell phones, smart phones, consumer appliances and/or instrumentation, industrial and/or commercial devices, digital assistants, multimedia Internet enabled phones, multimedia players, and the like.

As illustrated in FIG. 1, the system 100 can comprise bus 102, memory 104, processor 106, grid component 108, selection component 110 and/or machine learning component 112. The bus 102 can provide for interconnection of various components of the system 100. The memory 104 and processor 106 can carry out computation and/or storage operations of the system 100 as described herein. It is to be appreciated that in some embodiments one or more system components can communicate wirelessly with other components, through a direct wired connection or integrated on a chipset.

In one or more embodiments described herein of system 100, predictive analytics can be used to automatically generate models used by the system 100 to facilitate automatically classifying type of part defect, determining location of defect and learning the digital grid. For example, the automatic generation of the models can be based on information retained in a knowledgebase. As used herein, the term "knowledgebase" can be a database or other storage location or repository that can store one or more types of information. All such embodiments are envisaged.

The knowledgebase can comprise information related to the type of part defect, the location of defect and the digital grid. In some embodiments, the information related the type of part defect, the location of defect and the digital grid can be gathered over time and retained in the knowledgebase. In some embodiments, the information gathered can include engine history, operational characteristics, borescope inspection videos and/or images. Based on the obtained information, the system 100 can evaluate the knowledgebase (or multiple knowledgebases) and generate one or more patterns and/or can map information known about the type of part defect, the location of defect and the digital grid to the information known about other types of part defect, locations of defect and digital grids. The predictive analytics of system 100 can determine that, if information of the type of part defect, the location of defect and the digital grid is similar to one or more other types of part defect, locations of defect and digital grids, the models of the similar types of part defect, locations of defect and digital grids can be utilized to facilitate automatically classifying the type of part defect, determining the location of defect and learning the digital grid.

The computer processing systems, computer-implemented methods, apparatus and/or computer program products described herein can employ hardware and/or software to generate models that are highly technical in nature, that are not abstract and that cannot be performed as a set of mental acts by a human. For example, the one or more embodiments can perform complex interpretation and analysis on a copious amount of available information to generate the models and determine which models from the one or more models should be utilized for a type of part defect, location of defect and digital grid. In another example, the one or more embodiments can perform predictive analytics on a large amount of data to facilitate automatically classifying different data types with a high level of accuracy, even in the absence of detailed knowledge about the type of part defect, the location of defect and the digital grid. Accuracy can be evaluated by comparing a training set with a test set. After training a model employing a training set, accuracy can be calculated using a test set by computing percentage of output generated by the model running on the training set elements that matches a predicted target.

In various embodiments, the grid component 108 can generate a digital grid and visual layer overlay on a raw video feed from borescope inspections. A digital grid can be a shape outline of an engine component. The digital grid can overlay on top of a raw video feed (e.g., original video) of the inspection. It is appreciated that the raw video feed can be received from robots, drones or other types of device that can acquire a video recording of an engine components. The robots and/or drones can include micro-video cameras and can be placed throughout an entire engine. The robots and/or drones can be crawlers that crawl inside an engine to provide a live video feed, e.g., raw video feed. Different engine components or parts can have different grids. Alternatively, an engine component or part can also have multiple digital grids for different viewing angle and zoom level.

The digital grid can enable standardized images to be taken and remove variation in the image captured to improve image processing. The digital grid can be visible on the video inspection screen and the grid component 108 can lock the digital grid to align with the image of the component or part in the inspection video. For example, when the engine component or part comes in a position that align with the digital grid, the grid component 108 can lock the digital grid to enable an image to be taken in that position. This can ensure that an engine that is being inspected will receive a view of a part in the same position. The result can be standardized images with the best viewing angle and zoom level for the engine components.

The grid component 108 can generate the digital grid based on a rule set by analyzing past videos or based on the learned digital grid (e.g., the machine learning component can learn the rule set such as viewing angle and zoom level). More specifically, the digital grid can be formed based on analyzing past videos, images and/or actual part models. The digital grid can also be based on expert information. For example, an inspector can provide information such as viewing angle and zoom level of an engine component to generate the digital grid. The information relevant to generating the digital grid such as viewing angle and zoom level can also be learned by the machine learning component 112. For example, the machine learning component 112 can learn the rule set to create a digital grid. Furthermore, the machine learning component 112 can analyze the borescope inspection video to learn the viewing angle and zoom level that can provide useful information. This information can be used by the grid component 108 to generate a new digital grid for an engine component. The digital grid can be used to assist any new image that will be captured to be in that viewing angle and zoom level.

The borescope inspection video can be condensed into a shorter version with selected frames that capture part defects. The selection component 110 can identify which of the frames have the most information based on prior borescope inspection video images. The selection component 110 can analyze the borescope inspection video feed and identify the frames that capture information of part damage and defects. The selection component 110 can employ video abstraction techniques to extract from the borescope inspection video informative frames that are useful for an inspection. For example, the selection component 110 can analyze and select from a sequence of frames the frame that is most useful. For example, the selection component 110 can compare the contrast levels of a sequence of static images to determine which image provide the most information. The selected informative frames can be retained in a condensed version of the inspection video to help reduce storage space and ease the retrieval process. For example, an inspector can pull up information of a defect more easily when there is less information to search through.

The machine learning component 112 can classify the type of part defect and determine the location of defect. The type of part defect and location of defect can be, for example, based on historical data from past videos (e.g., previous database of images). Images from past videos that are identified based on whether a defect exists and the location of the defect can be learned by the machine learning component 112. For example, the machine learning component 112 can employ deep learning and feature recognition for distress or failure level identification. The classification of the type of part defect and the location of defect can be improved by considering engine history and operational characteristics. For example, the rate of damage accumulated by an engine component can be determined based on the severity of the environmental condition that the aircraft flew in.

The classification of the type of part defect and the location of defect can be displayed as an augmented reality layer on the raw video feed. For example, the borescope inspection hardware (e.g., robots, drones, etc.) can record the live or raw video feed. During the video recording, the grid component 108 can overlay a digital grid over the recorded image of the engine components. The grid component 108 can lock the digital grid to the image of the components when the two are aligned. The locking of the digital grid enables images to be captured at a standardized viewing angle and zoom level. The selection component 110 can select from a sequence of static frames captured, the frames that are informative. The machine learning component 112 can automatically analyze the selected frames to provide a list of key features. The machine learning component 112 can also automatically tag and overlay information with the video frames, which can be displayed as an augmented reality layer on the raw video feed. The overlay information can be, but is not limited to, the type of part defect, location of defect, size of defect, engine history, operational characteristics, etc. It is appreciated that the augmented reality layer can be provided on the same screen as the borescope inspection video or in different screens (e.g., a raw video feed and an augmented reality of the raw video feed).

The augmented reality layer can be coupled with information of the operating conditions of the engine to identify the reason or speed of damage or defect progression. For example, the machine learning component 112 can generate a condensed version of the raw video feed with an overlapping augmented reality layer containing the classification of the type of part defect, the location of the defect, the engine history and the operational characteristics. The machine learning component 112 can identify a list of key features within an image. The key features can be the type of engine component or part such as cooling holes, trailing edge, shroud segment, etc. The machine learning component 112 can also identify or classify the type of part defect such as, for example, material removal, corrosion, crack, etc. The machine learning component 112 can automatically learn from historical data or videos the type and location of defect. The machine learning component 112 can also learn the type and location of defect from input data from an inspector. The key features, type of defect and location of defect can be listed as an augmented reality layer or virtual information layer on top of the raw video feed. The machine learning component 112 can also learn the type and location of defect from a data feed or input of real-time data. For example, the real-time data can be the operational characteristics or operating conditions such as the type of oil being used, the regions the engine flew in, the number of cycles flown, etc. The machine learning component 112 can display an overlay information layer (e.g., augmented reality layer), containing information relevant to the type and location of defect, on the raw video feed and correlate the data to provide the cause of defect.

The borescope inspection can be performed in an online mode, which can be an on-wing inspection between flights without pulling the engine apart. The online mode can overlap the augmented reality layer on the raw video feed.

The borescope inspection can also be used offline by bringing the engine into a repair shop. The offline mode can analyze stored borescope inspection videos to continuously improve frame selection and defect identification. For example, an engine can be brought into a repair shop and the borescope inspection videos containing the augmented reality layer or virtual information layer can be analyzed and rated against data from engine inspection in the shop in the past. In the offline mode, the machine learning component 112 can continuously improve the digital grid, frame selection, defect identification, etc., based on the engine inspection data and feedback. For example, an inspector can provide input and modify the classification of the type of part defect in the overlay information.

Figure 2:
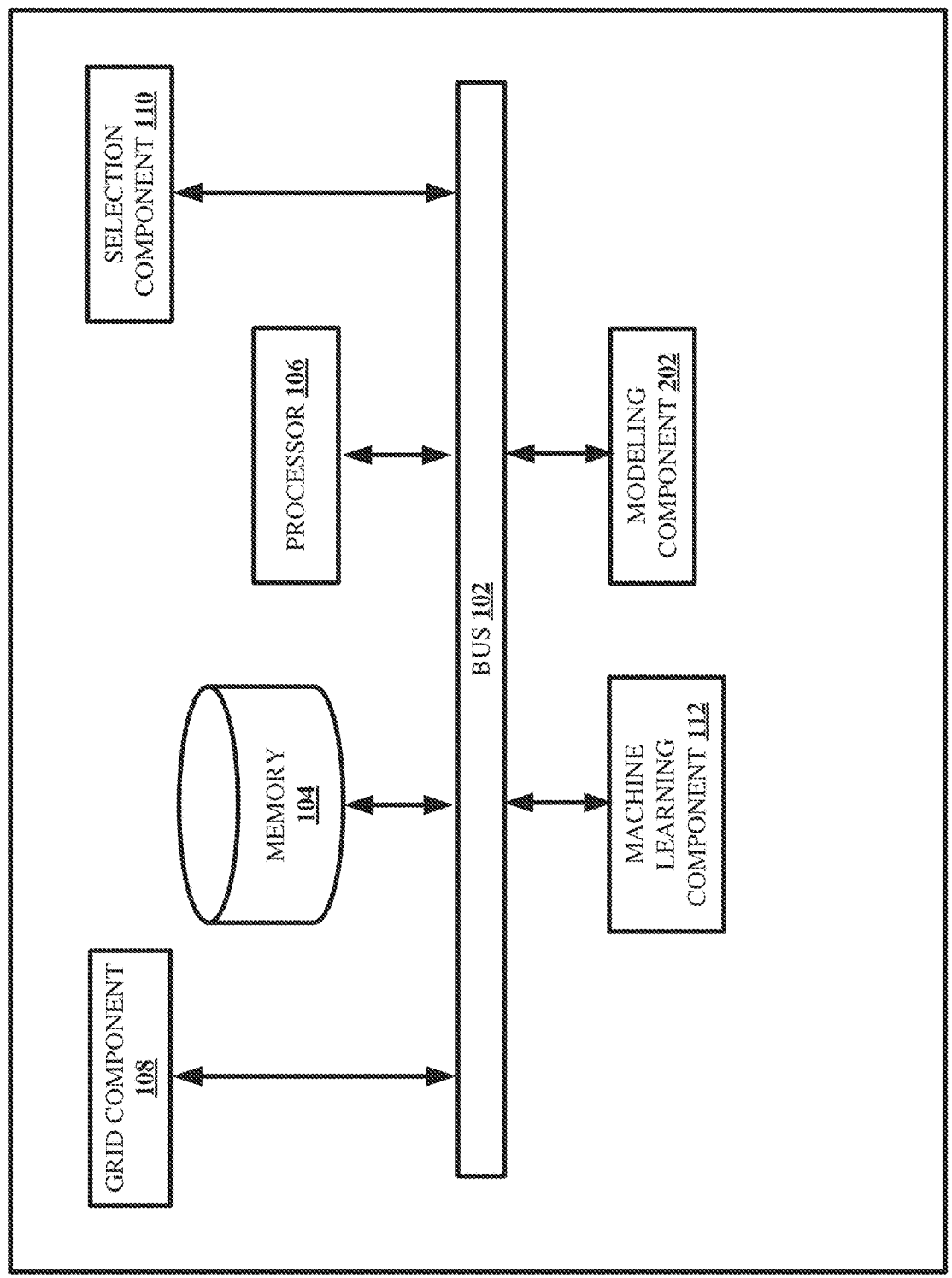
FIG. 2 illustrates a block diagram of an example, non-limiting system facilitating aviation engine inspection including a modeling component in accordance with one or more embodiments described herein.

FIG. 2 illustrates a block diagram of an example, non-limiting system 200 facilitating aviation engine inspection including a modeling component 202 in accordance with one or more embodiments described herein. Repetitive description of like elements employed in other embodiments described herein is omitted for sake of brevity. The modeling component 202 can generate models by employing the classification of the type of part defect, the location of defect and the learned digital grid. It is appreciated that the models are not limited to classification of the type of part defect, the location of defect and the learned digital grid. The type of part defect, the location of defect and the learned digital grid can be information obtained from the machine learning component 112. The models can be used to automatically make predictions.

For example, the models can be used by the grid component 108 to determine which grid to employ to capture an image. In another example, the models can be used by the selection component 110 to select the video abstraction techniques to apply (e.g., the abstraction technique can be based on the contrast level of an image). In another example, the machine learning component 112 can employ the models to automatically classify the type of part defect and determine the location of the defect. The predictions can be listed as an augmented reality layer or a virtual information layer on top of the raw video feed.

Figure 3:
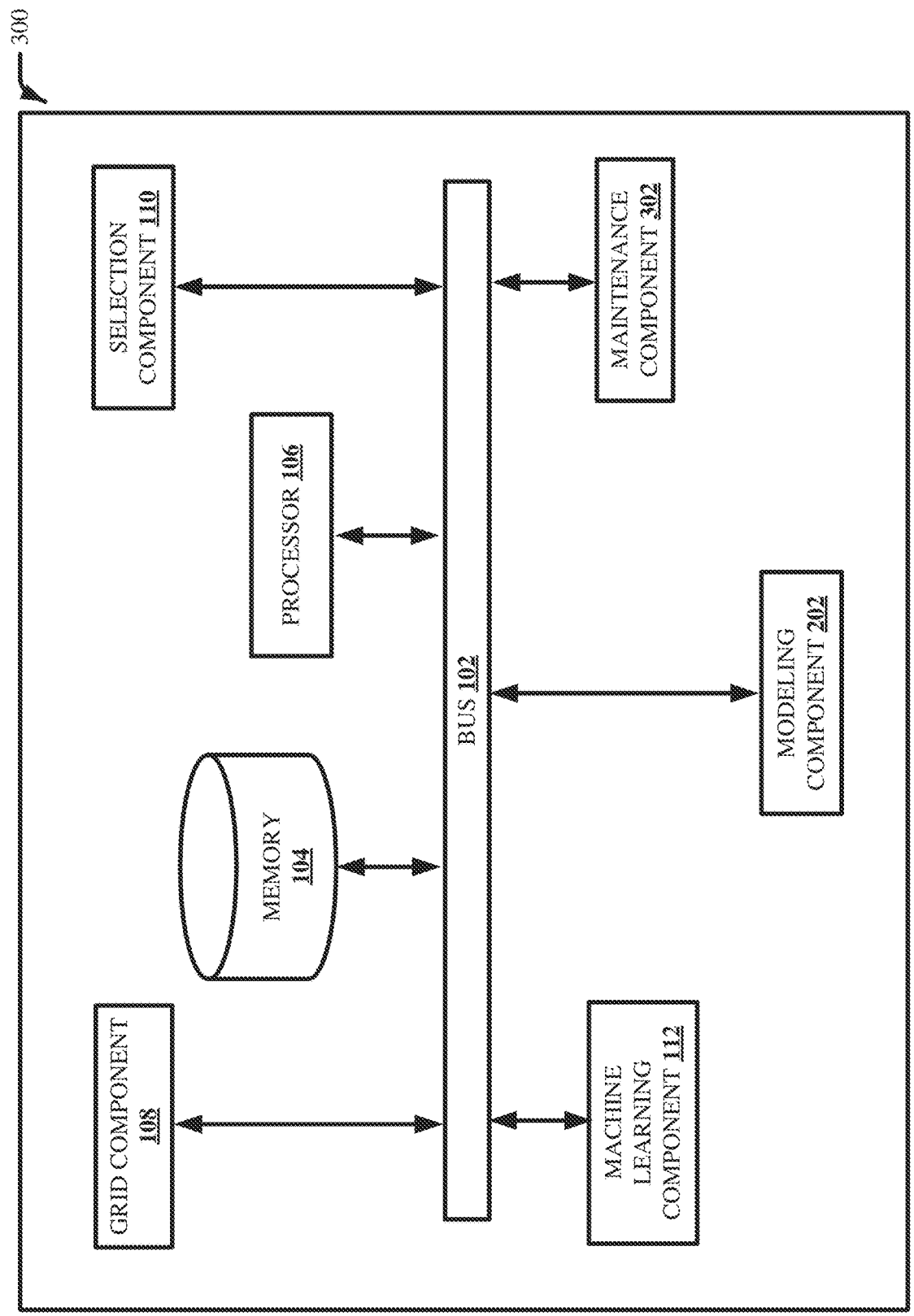
FIG. 3 illustrates a block diagram of an example, non-limiting system facilitating aviation engine inspection including a maintenance component in accordance with one or more embodiments described herein.

FIG. 3 illustrates a block diagram of an example, non-limiting system 300 facilitating aviation engine inspection including a maintenance component 302 in accordance with one or more embodiments described herein. Repetitive description of like elements employed in other embodiments described herein is omitted for sake of brevity. The maintenance component 302 can generate an alert of maintenance based on the classification of the type of part defect. For example, the maintenance component 302 can send an alert to an inspector to notify that a part needs to be repaired or replaced. The maintenance component 302 can also send notifications that an engine is too severely damaged to fly or inform the inspector of the number of cycles an engine has before a repair is required.

A borescope inspection can be performed on an aircraft without requiring the engine to be brought into a repair shop, pulling the engine apart and identifying the defects. The borescope inspection can be performed between flights. For example, an aircraft can be scheduled to have a borescope inspection every 1,000 cycles between flights, e.g., on-wing inspection. The maintenance component 302 can notify that a borescope inspection is due at a specified time prior to the due date.

Figure 4:
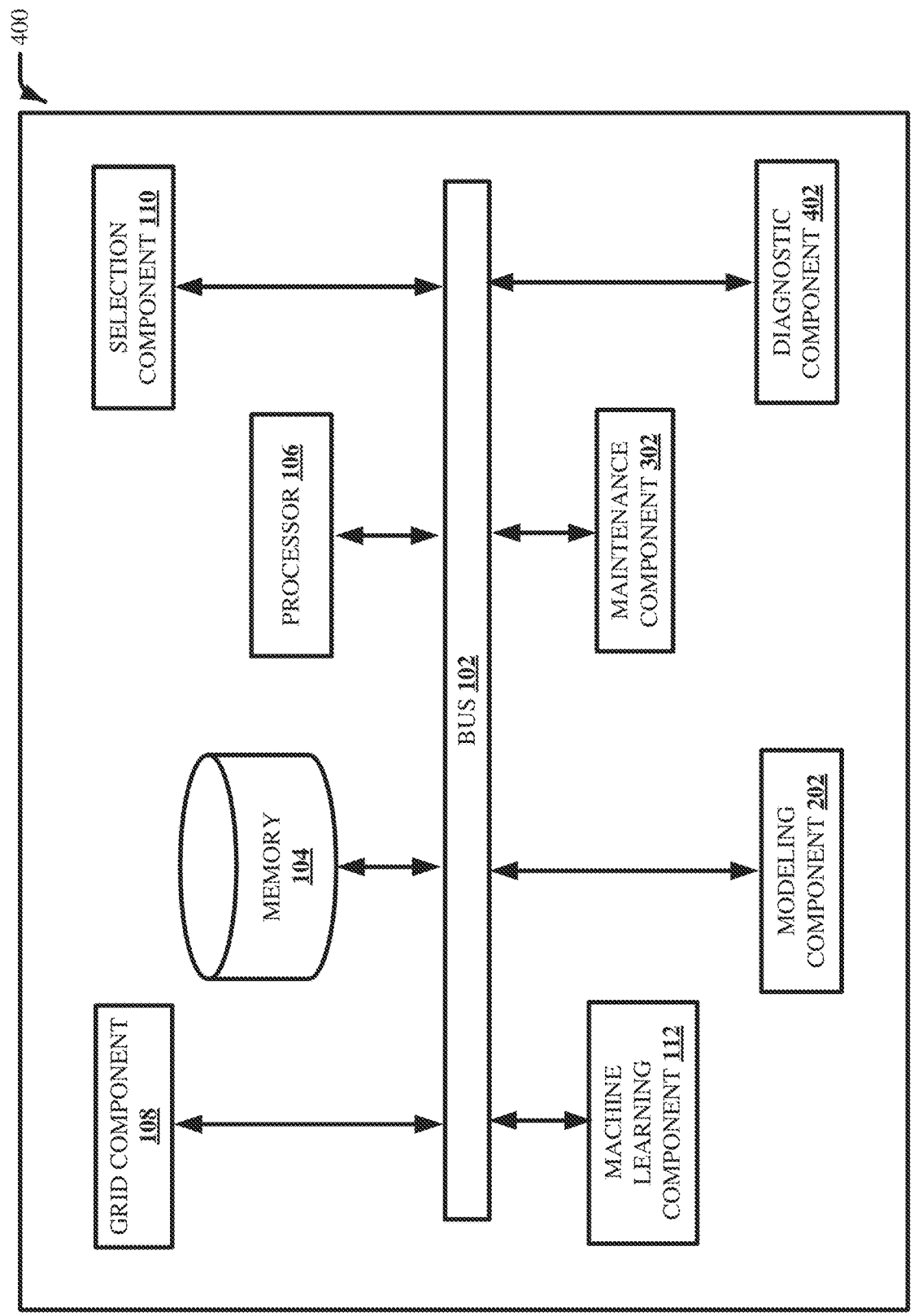
FIG. 4 illustrates a block diagram of an example, non-limiting system facilitating aviation engine inspection including a diagnostic component in accordance with one or more embodiments described herein.

FIG. 4 illustrates a block diagram of an example, non-limiting system 400 facilitating aviation engine inspection including a diagnostic component 402 in accordance with one or more embodiments described herein. Repetitive description of like elements employed in other embodiments described herein is omitted for sake of brevity. The diagnostic component 402 can employ real-time data including the classification of the type of part defect, the location of the defect, the engine history and the operational characteristics to generate a diagnosis of cause of the type of part defect. For example, the diagnostic component 402 can employ the information from the augmented reality layer coupled with the information of the operating conditions of the engine to make correlations between the type of defect and the operating conditions. For example, if in a subsequent borescope inspection, the corroded area has doubled in size, the diagnostic component 402 can identify the reasons for the speed of damage or defect progression. The diagnostic component 402 can correlate the defect information with the operating conditions and compare with other engines or models to determine the cause of defect.

Figure 5:
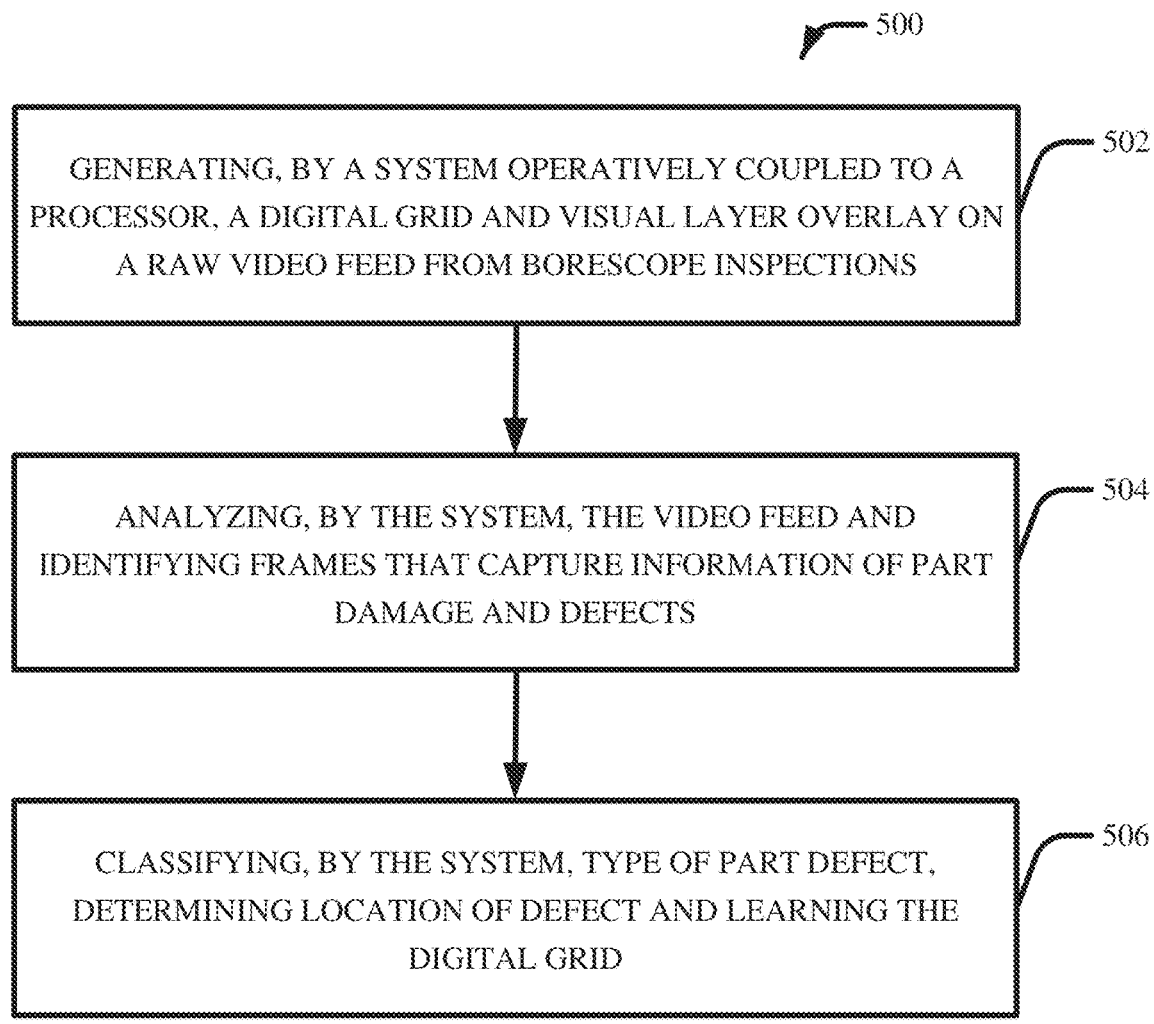
FIG. 5 illustrates a flow diagram of an example, non-limiting computer-implemented method facilitating aviation engine inspection in accordance with one or more embodiments described herein.

FIG. 5 illustrates a flow diagram of an example, non-limiting computer-implemented method 500 facilitating aviation engine inspection in accordance with one or more embodiments described herein. Repetitive description of like elements employed in other embodiments described herein is omitted for sake of brevity. At 502, the computer-implemented method 500 can comprise generating (e.g., via the grid component 108), by a system operatively coupled to a processor, a digital grid and visual layer overlay on a raw video feed from borescope inspections. The grid component 108 can generate the digital grid based on a rule set. The rule set can be based on analyses of past videos. The digital grid can be learned by the machine learning component 112. The digital grid can also be based on input of an inspector as to the viewing angle and zoom level. It is appreciated that the rule set can contain additional information.

At 504, the computer-implemented method 500 can comprise analyzing (e.g., via the selection component 110), by the system, the video feed and identifying frames that capture information of part damage and defects. The selection component 110 can employ video abstraction techniques to extract informative frames from the borescope inspection videos. The selection component 110 can analyze and select from a sequence of frames the frame that are informative as to the type of defect, location of defect, etc. The selected frames can be used to create a condensed version of the inspection video to reduce storage space and help ease the retrieval process.

At 506, the computer-implemented method 500 can comprise classifying (e.g., via the machine learning component 112), by the system, type of part defect, determining location of defect and learning the digital grid. Historical data from past videos can be employed to learn the type of part defect and location of defect. For example, the machine learning component 112 can learn of the type of part defect and location of defect from images of past videos that are identified based on whether a defect exists and the location of the defect. The machine learning component 112 can also detect the viewing angle and zoom level that can provide useful information to learn the digital grid for an engine component. Additionally, the type of defect, location of defect and digital grid can also come from inspector input.

Figure 6:
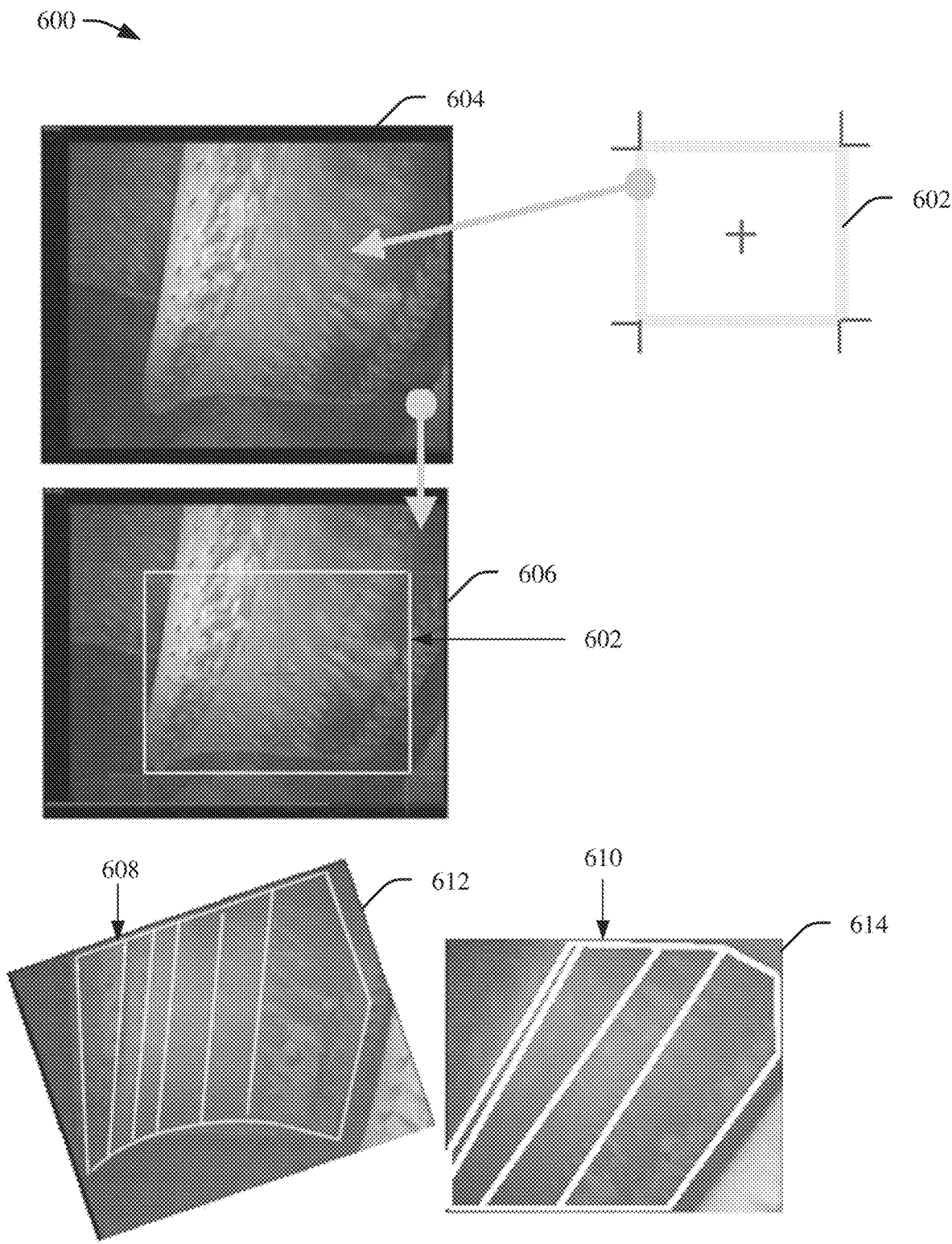
FIG. 6 illustrates a block diagram of an example, non-limiting image capture employing digital grids in accordance with one or more embodiments described herein.

FIG. 6 illustrates a block diagram of an example, non-limiting image capture 600 employing digital grids in accordance with one or more embodiments described herein. Repetitive description of like elements employed in other embodiments described herein is omitted for sake of brevity. The grid component 108 can perform the image capture 600 using digital grid 602. The grid component 108 can also generate the digital grid 602. The grid component 108 can also overlay the digital grid 602 to form the image 606. Digital grids can be predefined with corner points for different components or different views of the same component. For example, the digital grids 608 and 610 are examples of digital grids with corner points that are predefined for different viewing angles of the same engine component.

By employing digital grids, the grid component 108 can lock the digital grids to the components at a predefined viewing angle and zoom level to enable standardized imaging. For example, the images 612 and 614 have digital grids (e.g., digital grids 608 and 610) that are locked at a predefined viewing angle and zoom level. Capturing images by locking predefined digital grids enables standardized imaging. Standardized images can enhance auto analysis of the inspection video and reduce inspection time and error.

Figure 7:
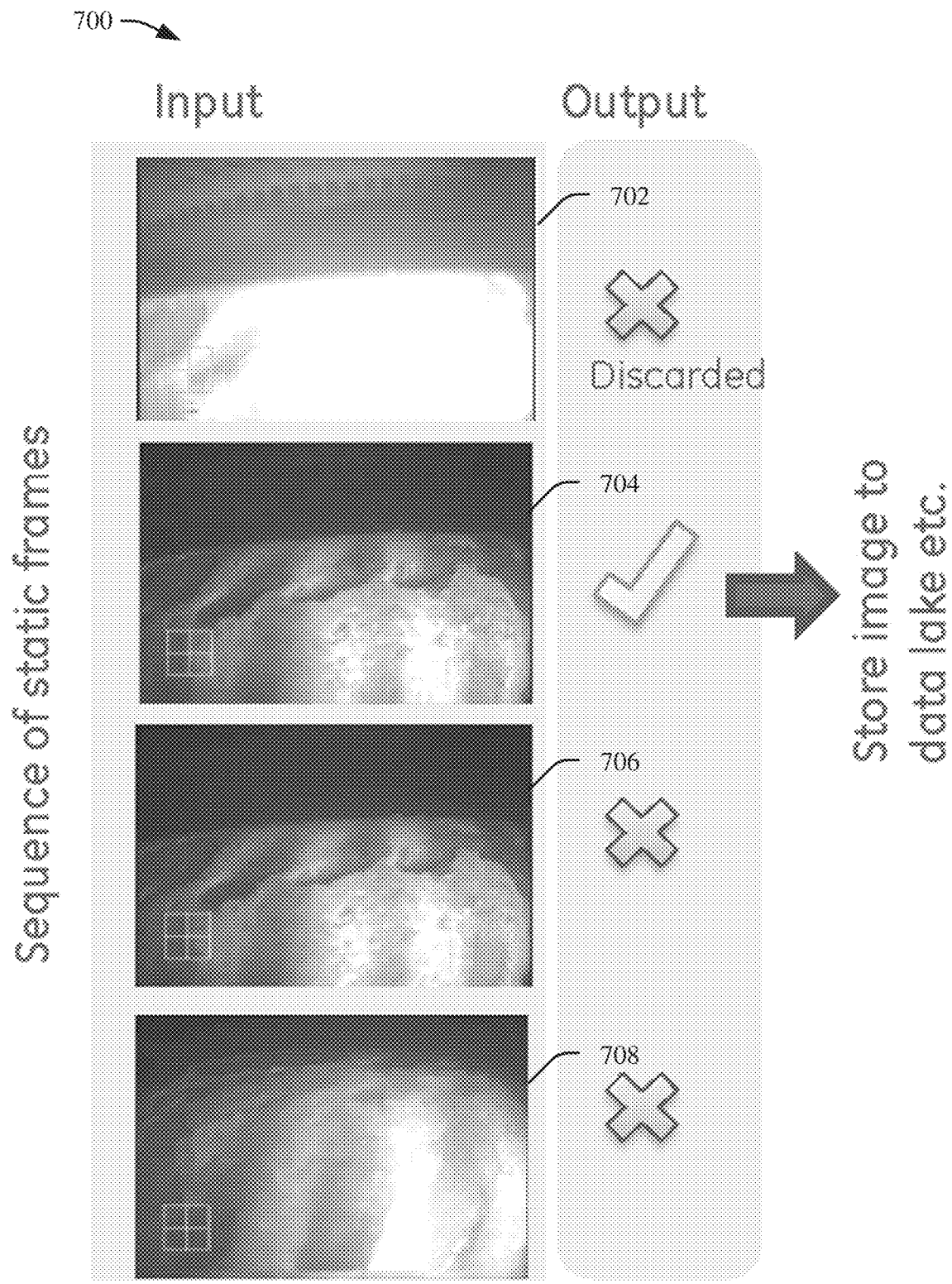
FIG. 7 illustrates a block diagram of an example, non-limiting data processing for frame selection in accordance with one more embodiments described herein.

FIG. 7 illustrates a block diagram of an example, non-limiting data processing 700 for frame selection in accordance with one more embodiments described herein. Repetitive description of like elements employed in other embodiments described herein is omitted for sake of brevity. The selection component 110 can perform the data processing 700 to select the best frames from the borescope video inspection. The data processing 700 has as input a sequence of static frames 702, 704, 706 and 708. The selection component 110 can analyze and select frame 704 to store in a data lake or repository while selecting to discard the frames 702, 706 and 708. The selection component 110 can employ video abstraction techniques for the frame selection. For example, the selection component 110 can analyze the contrast levels for the images and determine the frame that provide the most information from a sequence of static frames.

Figure 8:
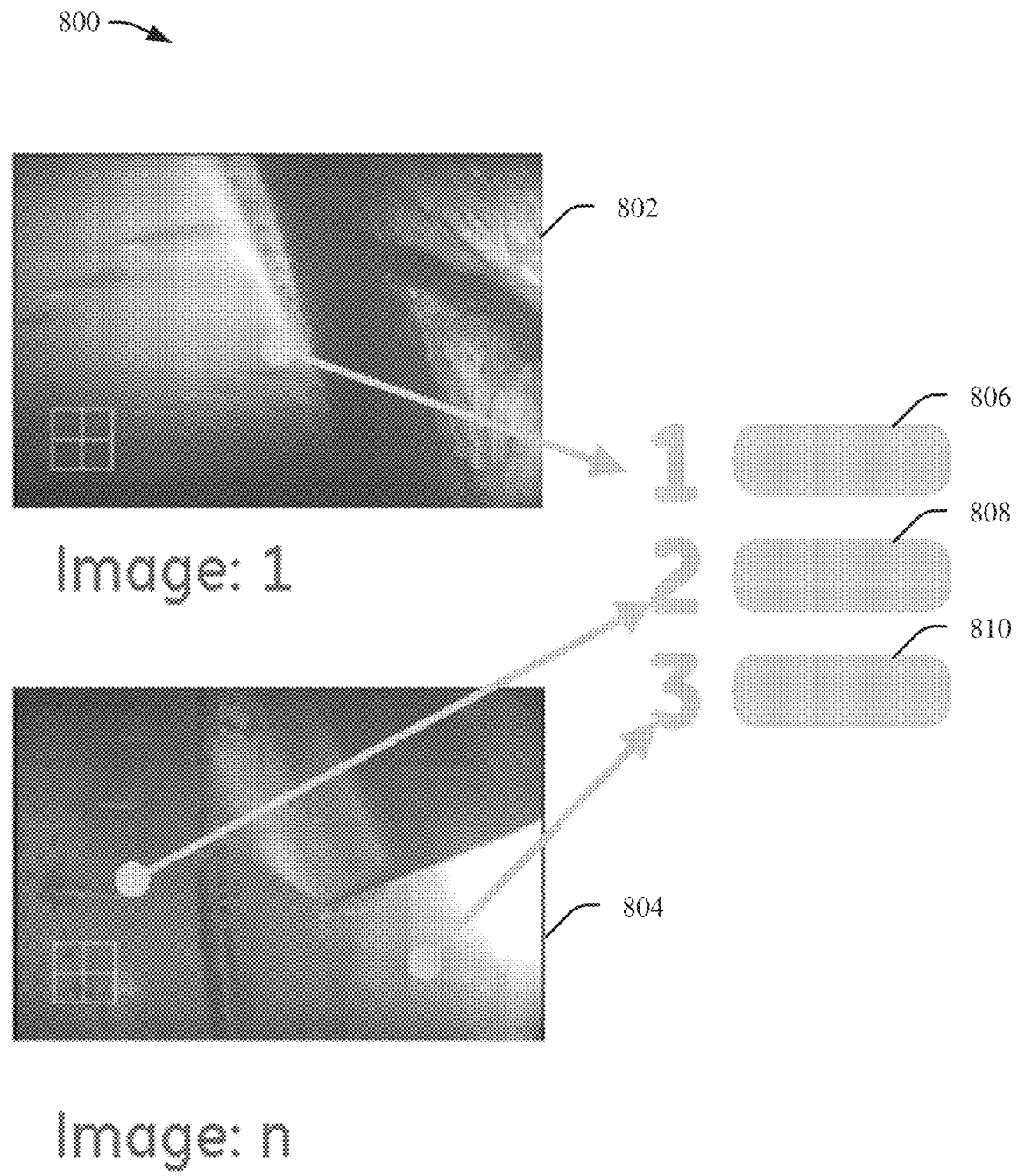
FIG. 8 illustrates a block diagram of an example, non-limiting auto analysis for feature recognition in accordance with one or more embodiments described herein.

FIG. 8 illustrates a block diagram of an example, non-limiting auto analysis 800 for feature recognition in accordance with one or more embodiments described herein. Repetitive description of like elements employed in other embodiments described herein is omitted for sake of brevity. The machine learning component 112 can perform auto analysis 800 for feature recognition for any number of images. The machine learning component 112 can analyze that the images 802 and 804 and generate a list of key features 806, 808 and 810. The key feature 806 can be cooling holes, the key feature 808 can be the shroud and the key feature 810 can be the base of the blade. The machine learning component 112 can employ deep learning and feature recognition using previous database of images to identify distress or failure level (e.g., defect). The machine learning component 112 can display the key features along with the classification of the type of part defect and the location of the defect as an augmented reality layer on the raw video feed.

Figure 9:
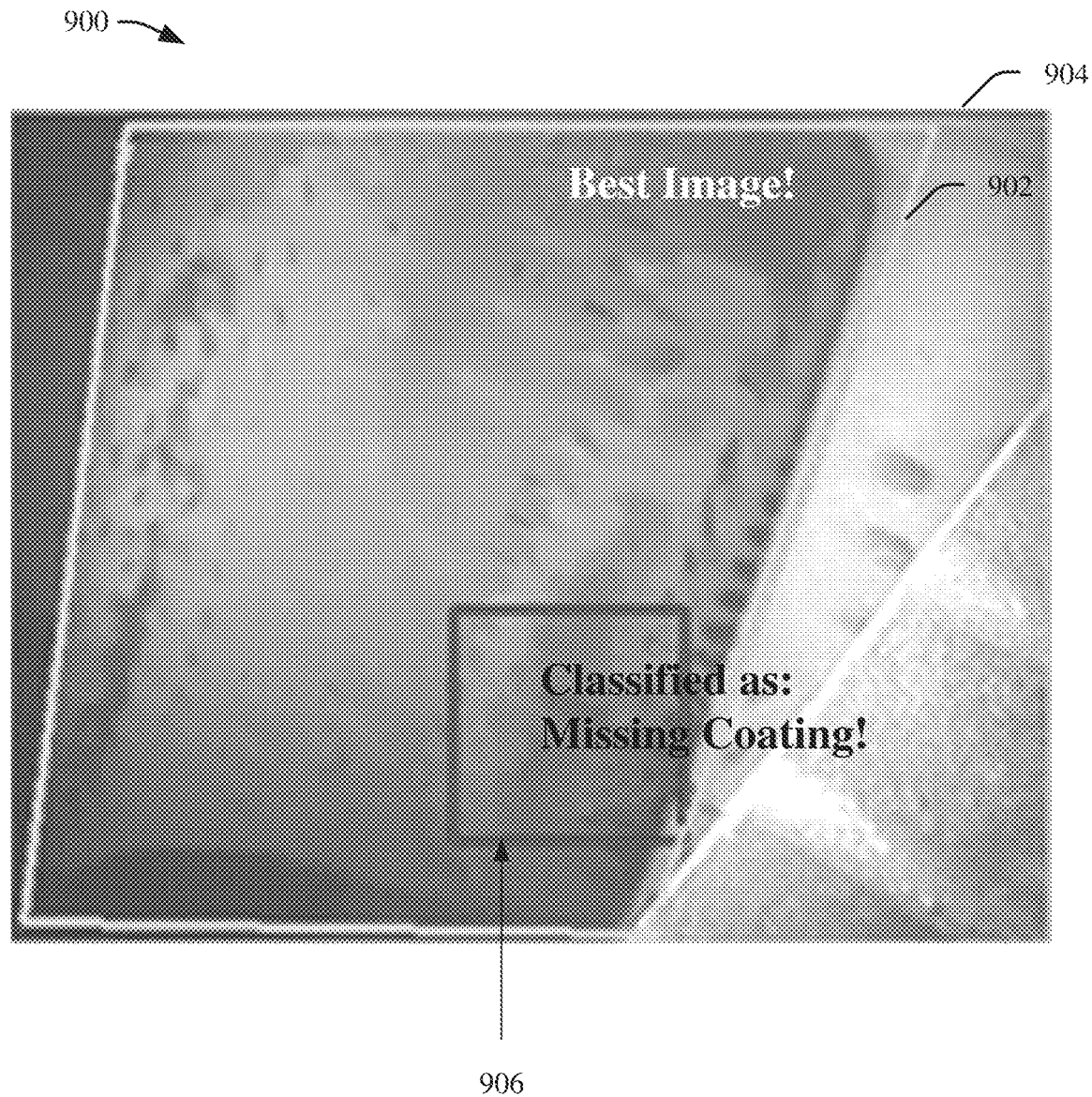
FIG. 9 illustrates a block diagram of an example, non-limiting information overlay in accordance with one or more embodiments described herein.

The machine learning component 112 can display the additional information overlay as an augmented reality layer as illustrated in FIG. 9. It is appreciated that the augmented reality layer can be presented in other forms with different colors, shapes, lines, etc. FIG. 9 illustrates a block diagram of an example, non-limiting information overlay 900 (e.g., augmented reality layer) in accordance with one or more embodiments described herein. Repetitive description of like elements employed in other embodiments described herein is omitted for sake of brevity. The grid component 108 can employ the grid 902 to capture the image 904. The selection component 110 can select from a sequence of static frames (not shown) the image 904 as the frame that captures the most information (e.g., best image). The machine learning component 112 can automatically analyze and display a list of key features (not shown). The machine learning component 112 can also display additional information overlay 906 that classifies the type of part defect as having missing coating. In this example, the additional information overlay 906 is a box that highlights the area of the defect and classifies the defect as having missing coating. The annotation can be by a box or by any other shape or even by highlighting the zone of defect in a different color.

Figure 10:
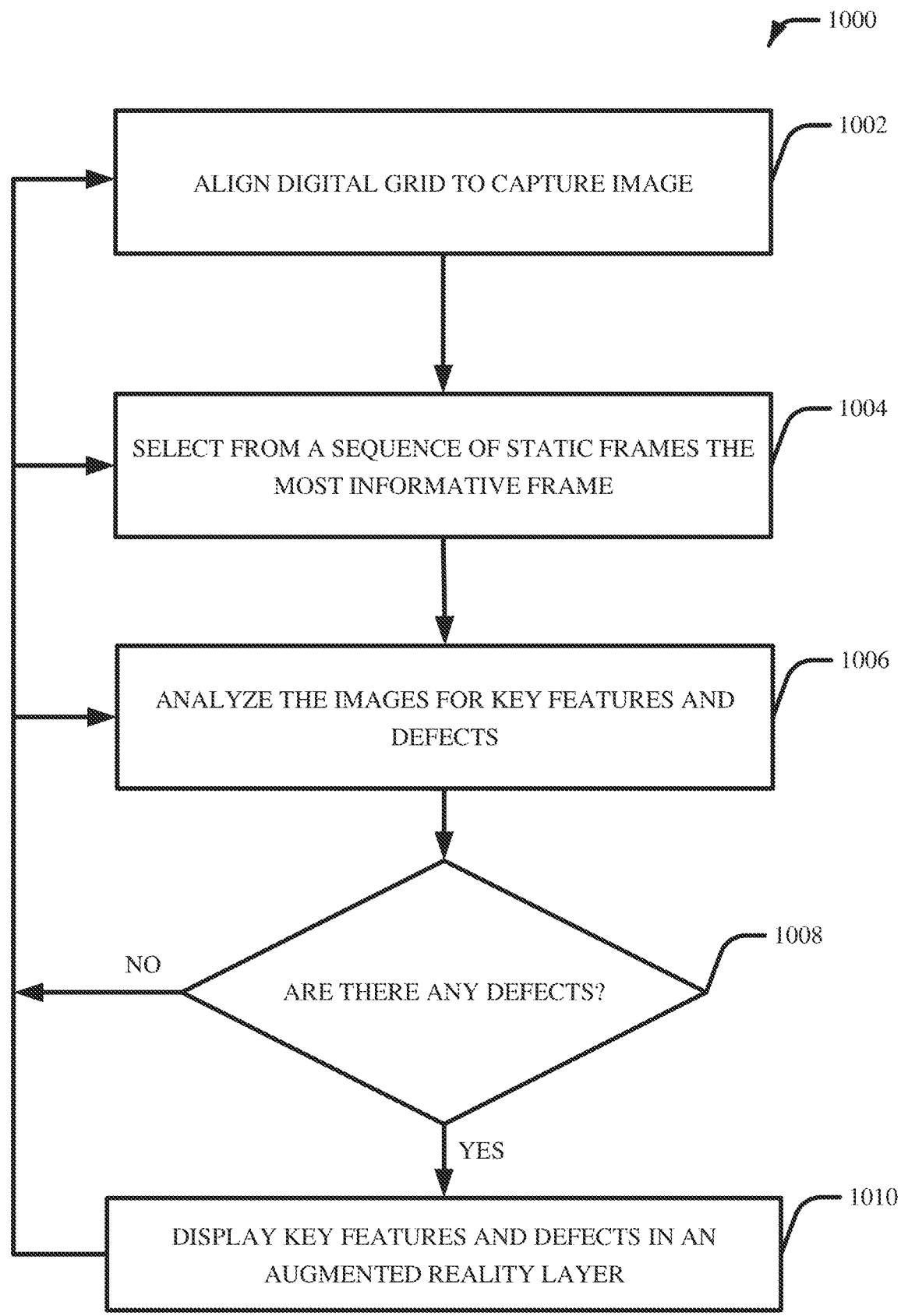
FIG. 10 illustrates a flow diagram of an example, non-limiting computer-implemented method facilitating aviation engine inspection in accordance with one or more embodiments described herein.

FIG. 10 illustrates a flow diagram of an example, non-limiting computer-implemented method 1000 facilitating aviation engine inspection in accordance with one or more embodiments described herein. Repetitive description of like elements employed in other embodiments described herein is omitted for sake of brevity. At 1002, the computer-implemented method 1000 can comprise aligning (e.g., via the grid component 108) the digital grid to capture an image at a predefined viewing angle and zoom level. Standardizing the images can enhance auto analysis of the images. At 1004, the computer-implemented method 1000 can comprise selecting (e.g., via the selection component 110) from a sequence of static frames (e.g., images) the most informative frame. Video abstraction techniques such as analyzing the contrast level of an image can be used to select the most informative frame. At 1006, the computer-implemented method 1000 can comprise analyzing (e.g., via the machine learning component 112) the images for key features and defects. Previous database images can be employed in deep learning and feature recognition for distress or failure level identification. At 1008, the computer-implemented method 1000 can comprise determining (e.g., via the machine learning component) whether there are any defects. If no, the data can be stored for predictive analytics to automatically capture an image at 1002, select the most informative frame at 1004 and analyze for key features and defects at 1006. If yes, at 1010, the computer-implemented method can comprise displaying (e.g., via the machine learning component 112) key features and defects in an augmented reality layer. This additional information can also be stored for predictive analytics.

Figure 11:
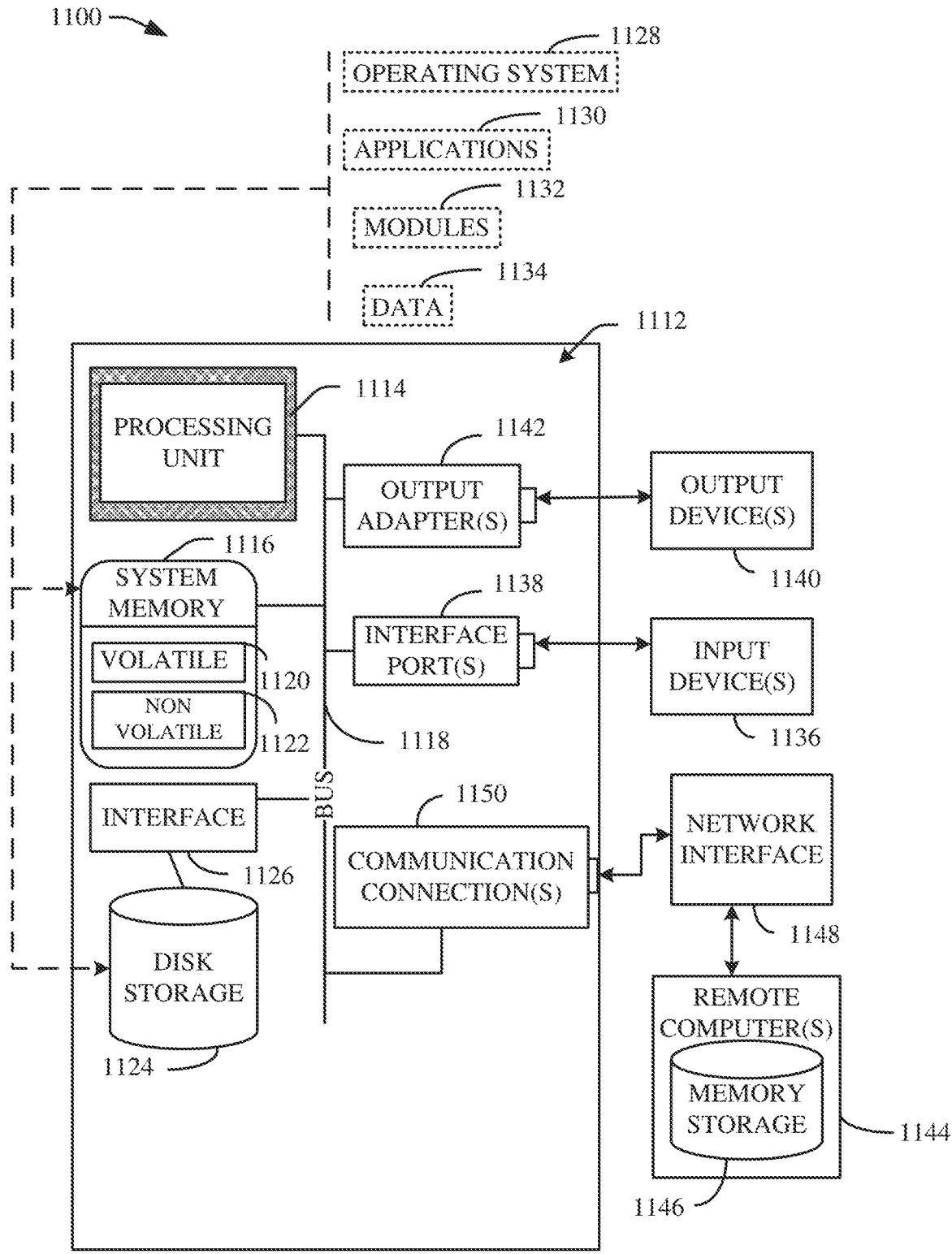
FIG. 11 illustrates a block diagram of an example, non-limiting operating environment in which one or more embodiments described herein can be facilitated.

To provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity.

With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media. To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112.

System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc., that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, handheld computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components;
    a processor, operably coupled to the memory, and that executes computer executable components stored in the memory, wherein the computer executable components comprise:
        a grid component that generates a digital grid and visual layer overlay on a raw video feed from borescope inspections, wherein the grid component locks the digital grid to an engine part depicted in the raw video feed at a predefined viewing angle and predefined zoom level when the digital grid aligns with the engine part;
        a selection component that analyzes the video feed and identifies frames that capture information of part damage and defects; and
        a machine learning component that classifies type of part defect, determines location of defect and learns the digital grid.

2. The system of claim 1, further comprising a modeling component that generates a model by employing the classification of the type of part defect, the location of the defect and the learned digital grid.

3. The system of claim 1, wherein the classification of the type of part defect and the location of the defect is improved by considering engine history and operational characteristics.

4. The system of claim 1, wherein the grid component generates the digital grid based on a rule set by analyzing past videos or based on the learned digital grid.

5. The system of claim 1, wherein the locking of the digital grid enables standardized images to be taken and removes variation in image capture to improve image processing.

6. The system of claim 1, wherein the classification of the type of part defect and the location of the defect are displayed as an augmented reality layer on the raw video feed.

7. The system of claim 1, wherein an online mode overlaps the augmented reality layer on the raw video feed.

8. The system of claim 1, wherein an offline mode analyzes stored borescope inspection videos to continuously improve frame selection and defect identification.

9. The system of claim 1, wherein the machine learning component generates a condensed version of the augmented reality layer overlapping the raw video feed containing the classification of the type of part defect, the location of the defect, the engine history and the operational characteristics.

10. The system of claim 1, further comprising a maintenance component that generates an alert of maintenance based on the classification of the type of part defect.

11. The system of claim 1, further comprising a diagnostic component that employs real-time data including the classification of the type of part defect, the location of the defect, the engine history and the operational characteristics to generate a diagnosis of cause of the type of part defect.

12. The system of claim 1, wherein the raw video feed is received from a robot or a drone.

13. A computer-implemented method, comprising:
generating, by a system operatively coupled to a processor, a digital grid and visual layer overlay on a raw video feed from borescope inspections, wherein the digital grid locks to an engine part depicted in the raw video feed at a predefined viewing angle and predefined zoom level when the digital grid aligns with the engine part;
analyzing, by the system, the video feed and identifying frames that capture information of part damage and defects; and
classifying, by the system, type of part defect, determining location of defect and learning the digital grid.

14. The computer-implemented method of claim 13, further comprising generating a model by employing the classification of the type of part defect, the location of the defect and the learned digital grid.

15. The computer-implemented method of claim 13, further comprising generating an alert of maintenance based on the classification of the type of part defect.

16. The computer-implemented method of claim 13, further comprising employing real-time data including the classification of the type of part defect, the location of the defect, the engine history and the operational characteristics to generate a diagnosis of cause of the type of part defect.

17. A computer program product for facilitating aviation engine inspection, the computer program product comprising a non-transitory computer readable storage medium having program instructions embodied therewith, the program instructions executable by a processor to cause the processor to:
generate a digital grid and visual layer overlay on a raw video feed from borescope inspections, wherein the digital grid locks to an engine part depicted in the raw video feed at a predefined viewing angle and predefined zoom level when the digital grid aligns with the engine part;
analyze the video feed and identify frames that capture information of part damage and defects; and
classify type of part defect, determine location of defect and learn the digital grid.

18. The computer program product of claim 17, wherein the program instructions are further executable to cause the processor to:
generate a model by employing the classification of the type of part defect, the location of the defect and the learned digital grid.

19. The computer program product of claim 17, wherein the program instructions are further executable to cause the processor to:
generate an alert of maintenance based on the classification of the type of part defect.

20. The computer program product of claim 17, wherein the program instructions are further executable to cause the processor to:
employ real-time data including the classification of the type of part defect, the location of the defect, the engine history and the operational characteristics to generate a diagnosis of cause of the type of part defect.

* * * * *